US007025366B2

United States Patent
Killian

(10) Patent No.: US 7,025,366 B2
(45) Date of Patent: *Apr. 11, 2006

(54) TWO WHEEL STEERING BICYCLE WITH EACH WHEEL HAVING ITS OWN STEERING CONTROL OPERATED BY RIDER'S LEFT AND RIGHT HAND RESPECTIVELY AND RIDER POSITIONED FACING THE DIRECTION OF MOTION

(76) Inventor: Michael Killian, 32 Westland Ave., Apt 16, Boston, MA (US) 02115

( * ) Notice: Subject to any disclaimer, the term of this patent is extended or adjusted under 35 U.S.C. 154(b) by 0 days.

This patent is subject to a terminal disclaimer.

(21) Appl. No.: 10/745,437

(22) Filed: Dec. 23, 2003

(65) Prior Publication Data

US 2005/0134017 A1    Jun. 23, 2005

(51) Int. Cl.
*B62K 17/00* (2006.01)
(52) U.S. Cl. ..................................... 280/267
(58) Field of Classification Search ........ 280/266–270, 280/259, 261, 263
See application file for complete search history.

(56) References Cited

U.S. PATENT DOCUMENTS

| | | | | |
|---|---|---|---|---|
| 2,995,384 | A * | 8/1961 | Rich | 280/269 |
| 4,157,739 | A | 6/1979 | Frye | 180/224 |
| RE30,547 | E * | 3/1981 | Belden | 280/240 |
| 4,506,902 | A | 3/1985 | Maebe | 280/266 |
| 4,650,021 | A | 3/1987 | Matsuda | 180/219 |
| 4,650,022 | A | 3/1987 | Sato | 180/219 |
| 4,664,213 | A | 5/1987 | Lin | 180/212 |
| 4,733,742 | A | 3/1988 | Frye | 180/223 |
| 5,485,893 | A | 1/1996 | Summers | 180/219 |
| 6,102,420 | A | 8/2000 | Hoeksta | 280/269 |
| 6,588,786 | B1 * | 7/2003 | Efflandt, Sr. | 280/261 |
| 6,598,892 | B1 * | 7/2003 | Killian | 280/267 |

* cited by examiner

*Primary Examiner*—Lesley D. Morris
*Assistant Examiner*—L. Lum

(57) ABSTRACT

A two wheel steering bicycle with two steering controls and rider positioned facing forward. A top tube member connects the rear head tube to the front head tube. The rear wheel attaches to the rear fork extending upwards. The rear fork steerer column passes through the rear head tube and can rotate within the rear head tube by means of a bicycle bearing headset. A rear steering handle is connected to the rear fork steerer column. The rear steering handle is designed to contact the rider's first hand. The front wheel attaches to the front fork extending upwards. The front fork steerer column passes through the front head tube and can rotate within the front head tube by means of a bicycle bearing headset. A front steering handle is connected to the front fork steerer column. The front steering handle is designed to contact the rider's second hand. A seat tube member attaches to the top tube member. A bicycle saddle is attached to the seat tube member in such a way as to position the rider facing forward parallel to the longitudinal axis of the top tube member. A bicycle bottom bracket, front sprocket, left and right crank and pedals are attached to the device. The rider's left hand is positioned at the rider's left side and contacts one of the steering handles. The rider's right hand is positioned at the rider's right side and contacts the other steering handle. The saddle and steering handles should be adjusted so that the rider's body is roughly balanced across the vertical plane of the rear and front wheels. The device moves forward and the rider keeps the device balanced by constantly correcting the front and rear steering handles. It may take some practice to make this correction reflex, but once mastered this device offers more control and artistic expression than a currently available bicycle.

3 Claims, 6 Drawing Sheets

TWO WHEEL STEERING BICYCLE WITH EACH WHEEL HAVING ITS OWN STEERING CONTROL OPERATED BY RIDER'S LEFT AND RIGHT HAND RESPECTIVELY AND RIDER POSITIONED FACING THE DIRECTION OF MOTION

FIELD OF THE INVENTION

The present invention relates to recreational devices like bicycles.

BACKGROUND OF THE INVENTION

The invention relates to bicycles and comprises a top tube member, saddle and two steerable wheels mounted in a longitudinal direction, each having its own steering control. More specifically, the present invention relates to bicycles which can be used to traverse smooth and rough terrain including mountain slopes.

A regular bicycle has a single steering control (handlebar) that steers the front wheel. The riders hands grip either ends of the handlebar and operates the steering control by pushing with one hand and pulling with the other hand; or visa versa. Thus both hands are involved with operating this single steering control.

For about 18 months I have been riding bicycles based on this inventors U.S. Pat. No. 6,598,892 entitled "Two wheel steering bicycle with latitudinal aligned wheels". The rider is positioned perpendicular to the direction of motion and the two steerable wheels are controlled by the rider's left and right hand respectively. These steering controls are independent and they are not linked in any way.

I notice that the operation of front and rear steering are rarely symmetric and the operation of the rear steering is generally delayed by up to 2 seconds. The front and rear steering inputs are generally 50:50 in normal operation. The orientation of the inner ear canals that detect human balance are not aligned along the vertical and horizontal axed. This has left me confused as to the operation of this bicycle (U.S. Pat. No. 6,598,892).

I made the observation that the human is quite capable of steering independently and out of phase in this manner. I believe that this human capacity is derived from the general left to right symmetry of the human body. Also when thinking about the human walking motion I notice that the operation of the left leg is largely the same as operation of the right leg but 90 degrees out of phase.

Rethinking why this bicycle (U.S. Pat. No. 6,598,892) works so well, I now believe it is a combination of two steering controls and the correct leverage. I still believe that the human balance capacity in the front to back direction is a great instrument. This leads to the current invention; a two wheel steering forward facing bicycle with two steering controls.

There are a number of two wheel steering bicycles in the prior art.

These include:

Matsuda U.S. Pat. No. 4,650,021 entitled "Rear wheel steering device for motorcycles having limited means".

Matsuda et al. U.S. Pat. No. 4,664,214 entitled "Motorcycle having steered front and rear wheels with control for ratio"

Frye U.S. Pat. No. 4,733,742 entitled "Two wheeled steerable vehicle".

Frye U.S. Pat. No. 4,157,739 entitled "Motorcycle".

Sato et al. U.S. Pat. No. 4,650,022 entitled "Rear wheel steering device for motorcycles"

Summers U.S. Pat. No. 5,485,893 entitled "Vehicle".

The Drysdale two wheel drive two wheel steering motorcycle (http://home.mira.net/~iwd/2x2x2/index.html).

Tony Foale discussion of two wheel steering with linked steering (http://www.tonyfoale.com/Articles/2WD_2WS/2WD_2WS.htm).

Tony Foale picture of two wheel steering bicycle with linked steerings (http://www.tonyfoale.com/gallery/PlayTime/pages/172WS_JPG.htm).

All of the prior art have one steering control that control both front and rear steering.

Other two wheel steering devices with linked steerings include:

Hoeksta U.S. Pat. No. 6,102,420 entitled "Walking cycle with steerable front and rear wheel"

Maebe, U.S. Pat. No. 4,506,902 entitled "Bicycle with steerable wheels" describe a device where the front wheel is steered with a regular two handed handlebar and the rear wheel is steered by the seat and or the pedal crank.

The present invention discloses a two wheel steering bicycle with two steering controls and rider positioned facing forward. This will leverage human left to right balance. The user sits on a saddle connected to the seat tube and balances the device by continuously correcting the orientation of the front and rear wheel with his/her first and second hand respectively. The user's body faces the direction of motion. The saddle, front and back steering handles should be adjusted to position the user's body to roughly balance the left to right center axis of the device.

The user's left hand is held to the left side of the user's body and contacts one of the steering handles. The user's left hand is sufficiently clear of the user's body to allow either pushing or pulling of the steering handle.

The user's right hand is held to the right side of the user's body and contacts the other of the steering handles. The user's right hand is sufficiently clear of the user's body to allow either pushing or pulling of the steering handle. The user's left and right hand operate independently and can execute whatever control to maintain the user in an upright position. The user must be in a state of constant correction which with practice will become natural and reflex. This device moves the user in a forward direction. The invention is configured with a saddle and a means of powering the device. Preferably the means of propelling the device is a regular bicycle bottom bracket, front sprocket, crank and pedals driving a bicycle chain connected to the rear wheel. The device could also be configured with a bicycle chain connected to the front wheel or indeed both rear and front wheels. The device could also be configured with a linear drive system. Propelling the device requires actions similar to a regular bicycle. The user moves the pedals in a circular motion which drives the drive chain and the rear wheel. Once the user has mastered the basics of propulsion and turning the user can start introducing his/her weight into the turns by leaning into the turns. The feedback from this device is strongest when the user uses his/her weight. This will excel at carving turns and will work best on open paved areas or grass slopes. It is expected that this invention will be more expressive than a regular bicycle and will reward the operator with much positive feedback of having mastered his/her balance.

SUMMARY OF THE INVENTION

It is an object of the present invention to provide a two wheel steering bicycle with two steering control members and rider positioned facing forward.

It is a more particular object of the invention to provide a top tube member and seat tube member with saddle and drive mechanism. The saddle positions the rider facing parallel to the longitudinal axis of the top tube member.

It is an object of the present invention to provide front and rear bicycle head tubes attached to each end of the top tube member.

It is an object of the present invention to provide front and rear wheels supported by forks whose steerer columns extend through respective bicycle headsets and front and rear head tubes.

Each fork steerer column attaches to an associated steering control member.

The rear steering control member is positioned to contact with the user's first hand.

The front steering control member is positioned to contact with the user's second hand.

DESCRIPTION OF THE DRAWINGS

These and other aspects of the present invention will become more evident upon reading the following description of the preferred embodiment in conjunction with the accompanying drawings, in which.

DETAILED DESCRIPTION OF PREFERRED EMBODIMENTS

Figure 1:
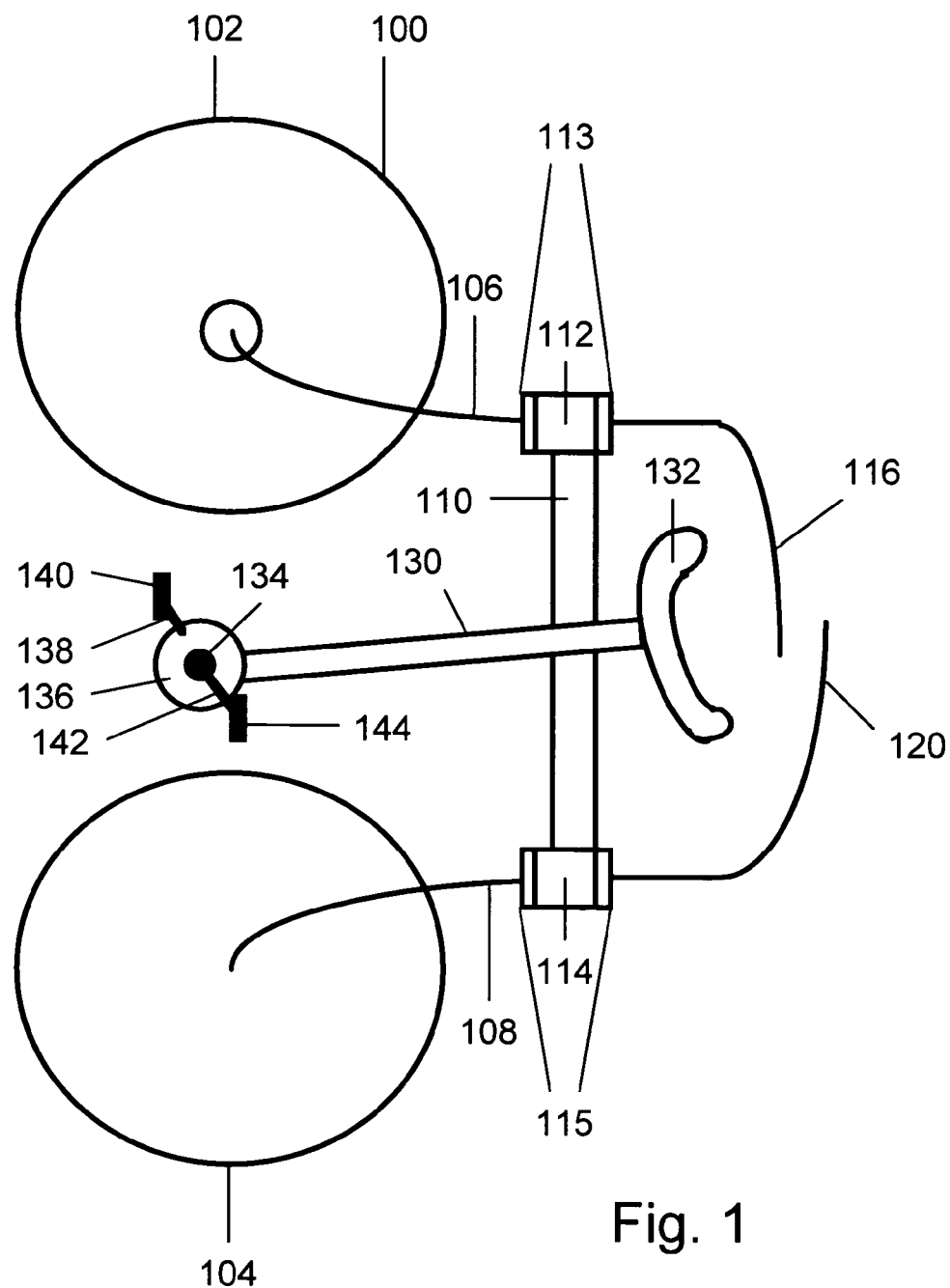
FIG. 1 is a side view of the current invention where the rider's right side would be visible.

FIG. 1 illustrates the current invention 100. In FIG. 1 rear wheel 102 and front wheel 104 support rear fork 106 and front fork 108 respectively from the ground. Top tube member 110 connects to rear head tube 112 and front head tube 114. The steerer column of rear fork 106 extends through rear headset 113 and rear head tube 112 to connect with rear steering control member 116. The steerer column of front fork 108 extends through front headset 115 and front head tube 114 to connect with front steering control member 120. Seat tube member 130 connects to top tube member 110. Saddle 132 connects to seat tube member 130. Bicycle bottom bracket 134 connects to seat tube member 130. Bicycle left crank 138 and left pedal 140 connect to the left side of bicycle bottom bracket 134. Bicycle front sprocket 136, right crank 142 and right pedal 144 connect to the right side of bicycle bottom bracket 134.

Figure 2:
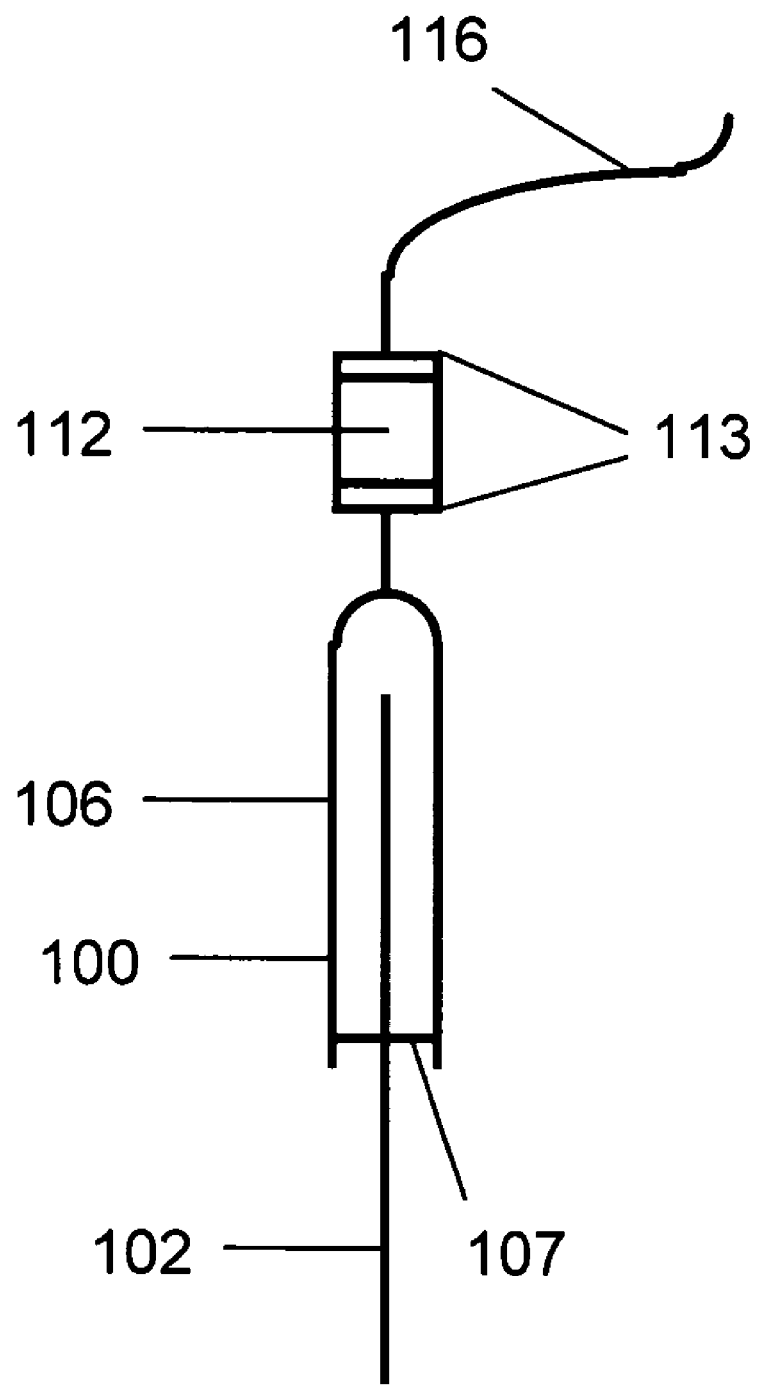
FIG. 2 is a rear view of a portion of the current invention detailing the rear wheel, rear fork, rear head tube, rear headset and rear steering handle.

FIG. 2 is a rear view of a portion of the current invention 100. In FIG. 2 rear wheel 102 is connected to rear fork 106 at axle 107. The steerer column of rear fork 106 extends through rear headset 113 and rear head tube 112 to rear steering control member 116.

Figure 3:
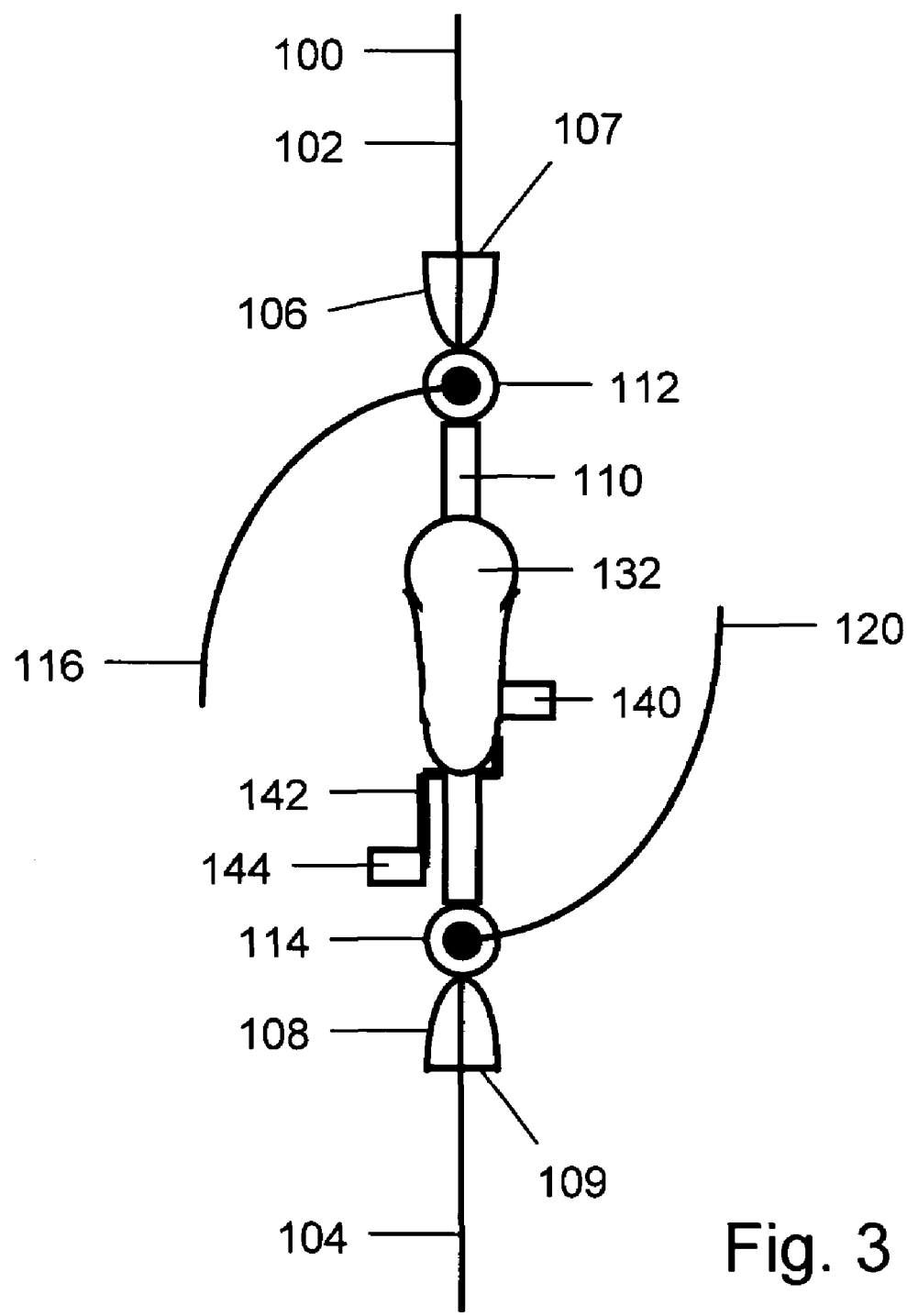
FIG. 3 is a top view of the current invention.

FIG. 3 is a top view of the current invention 100. In FIG. 3 rear wheel 102 is connected to rear fork 106 at axle 107. Front wheel 104 is connected to front fork 108 at axle 109. Top tube member 110 connects to rear head tube 112 and front head tube 114. Saddle 132 connects to seat tube member. The steerer column of rear fork 106 extends through rear head tube 112 to connect with rear steering control member 116. The steerer column of front fork 108 extends through front head tube 114 to connect with front steering control member 120. Bicycle right crank 142 and right pedal 144 connect to the right side of bicycle bottom bracket. Bicycle left pedal 140 connects to the left crank which connect to the left side of bicycle bottom bracket.

Figure 4:
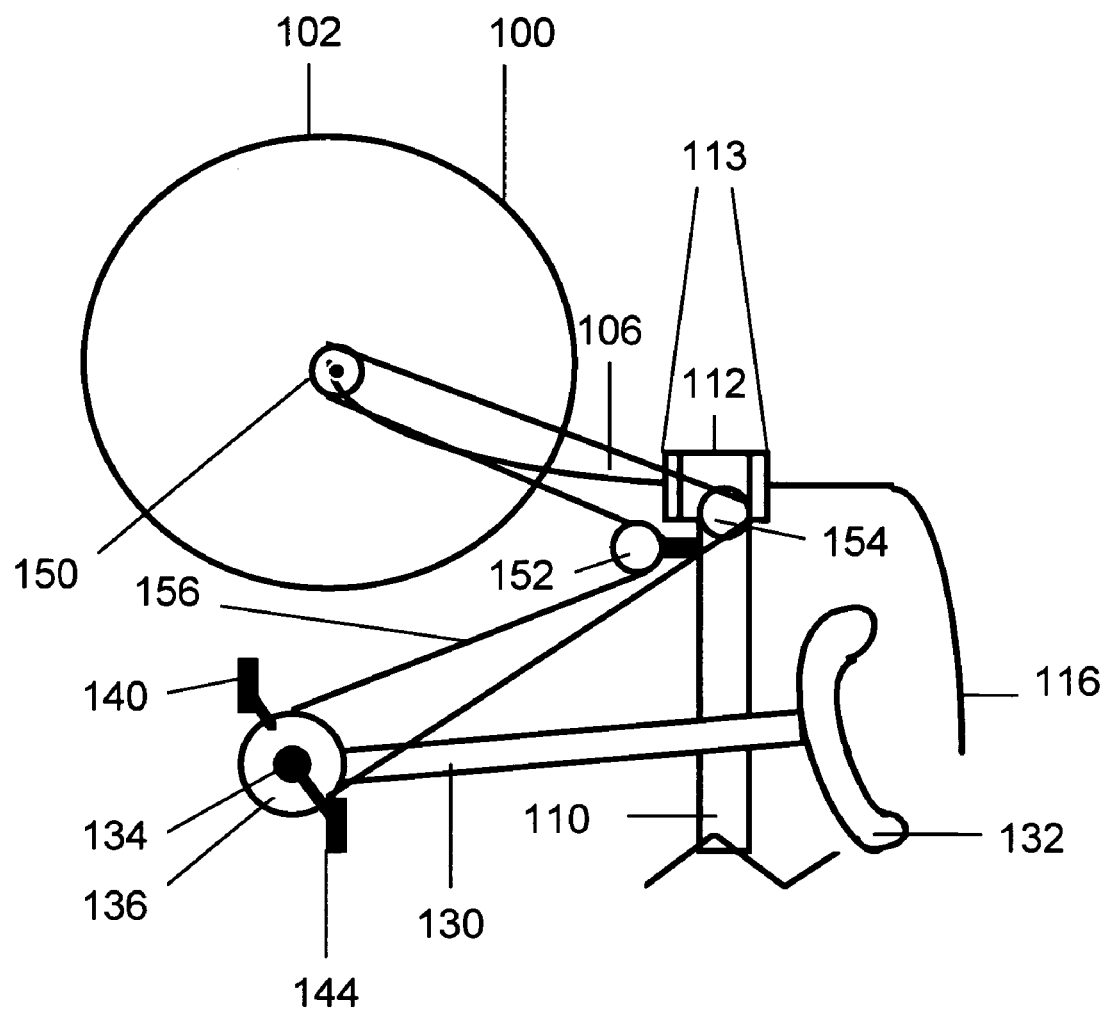
FIG. 4 is a side view of a portion of the current invention detailing the routing of the drive chain.

FIG. 4 illustrates a portion of the current invention 100 which illustrates the drive chain routing. In FIG. 4 rear wheel 102 supports rear fork 106 from the ground. Top tube member 110 connects to rear head tube 112. The steerer column of rear fork 106 extends through rear headset 113 and rear head tube 112 to connect with rear steering control member 116. Seat tube member 130 connects to top tube member 110. Saddle 132 connects to seat tube member 130. Bicycle bottom bracket 134 connects to seat tube member 130. Bicycle left crank and left pedal 140 connect to the left side of bicycle bottom bracket 134. Bicycle front sprocket 136, right crank and right pedal 144 connect to the right side of bicycle bottom bracket 134. Chain 156 drives rear wheel sprocket 150 from bicycle front sprocket 136 and is routed over intermediate sprockets 152 and 154.

Figure 5:
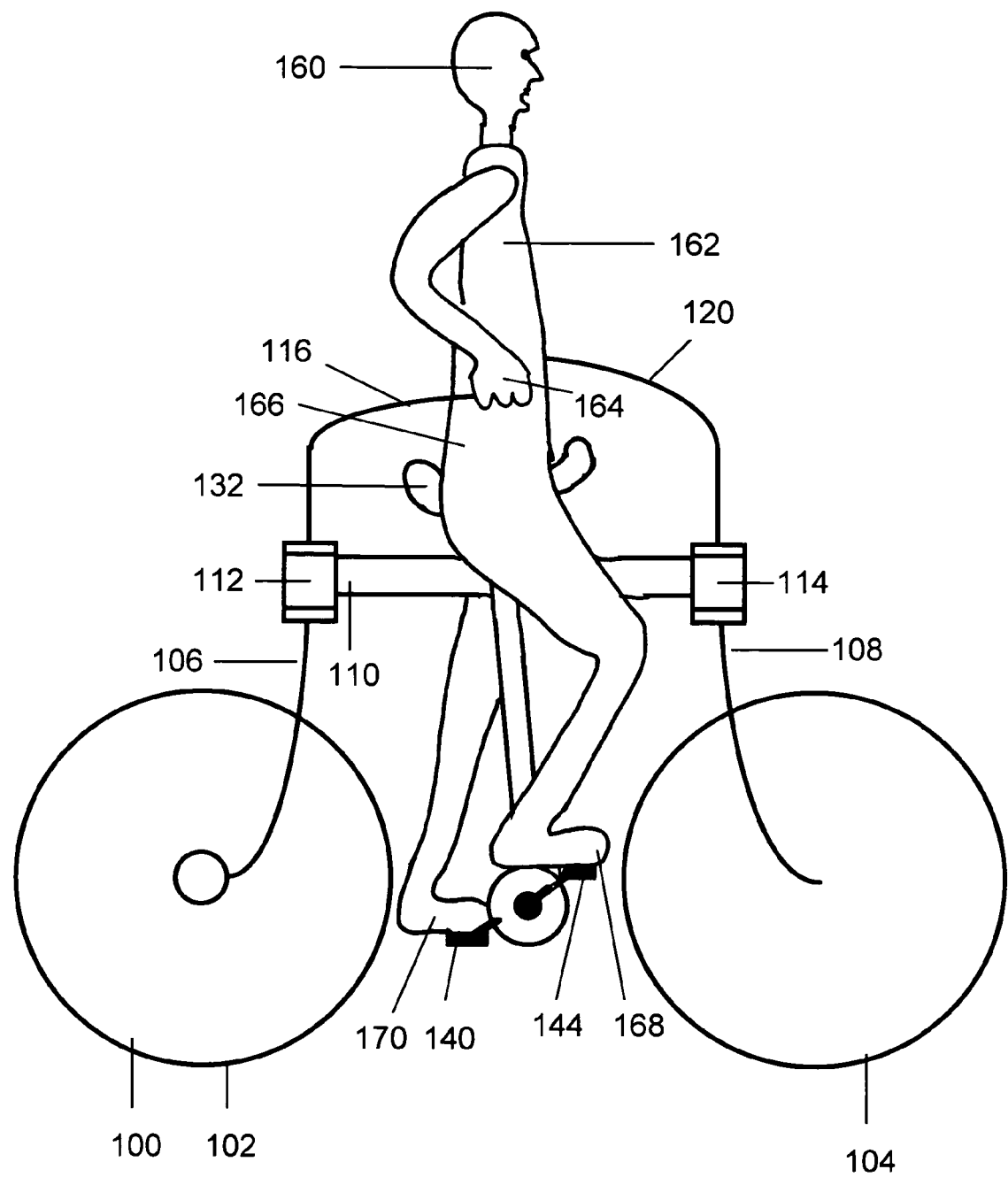
FIG. 5 is a side view of a user riding the current invention where the user's right side is visible.

FIG. 5 illustrates a rider 160 riding the current invention 100. In FIG. 5 the rider's right side 162 is illustrated. The rider's right hand 164 contacts rear steering control member 116. The rider's seat 166 rests on saddle 132. The rider's right foot 168 is positioned on the right pedal 144. The rider's left foot 170 is positioned on the left pedal 140 of the invention 100.

Figure 6:
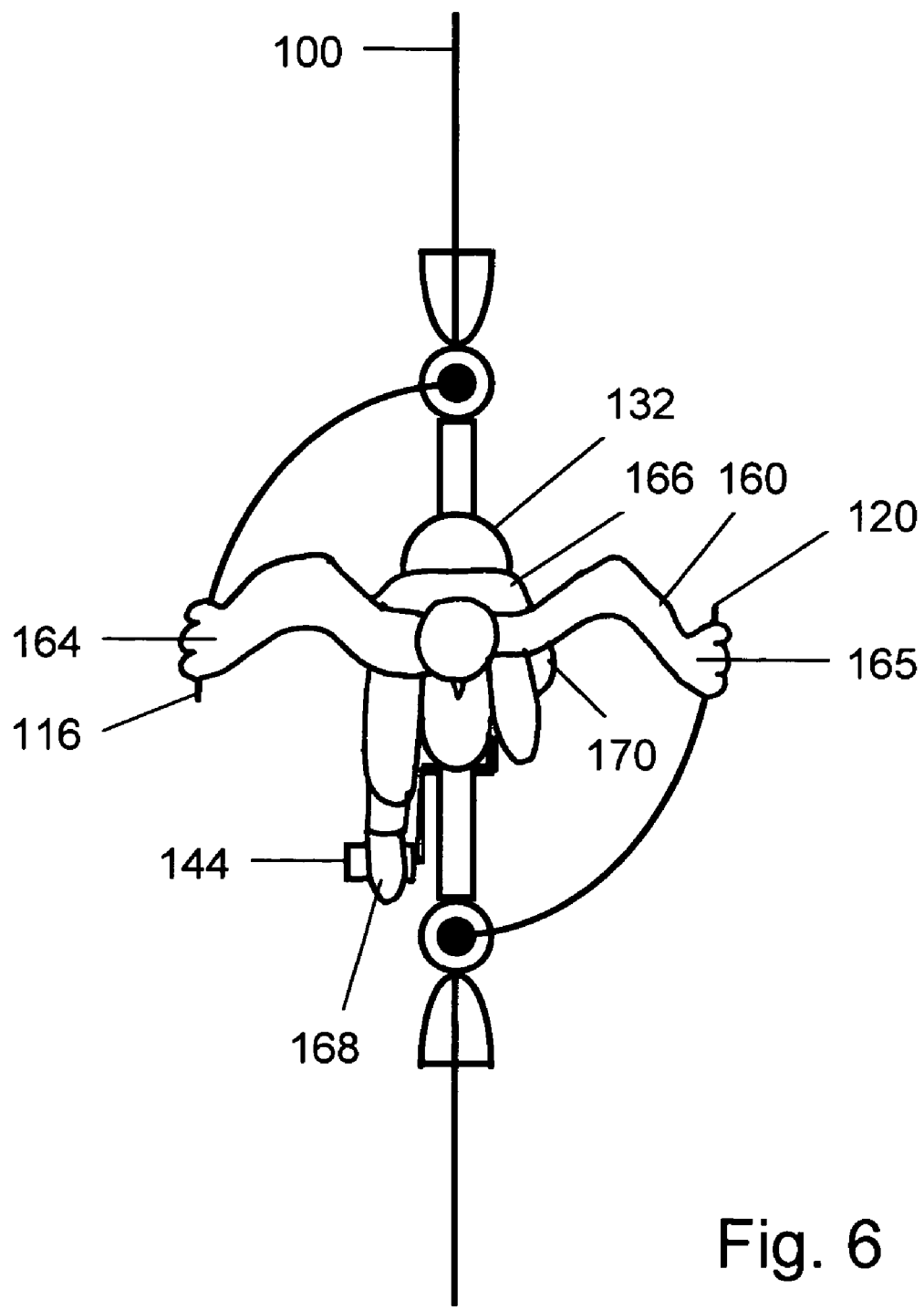
FIG. 6 is a top view of a user riding the current invention.

FIG. 6 illustrates the top view of rider 160 riding the current invention 100. In FIG. 6 the rider's right hand 164 contacts rear steering control member 116. The rider's left hand 165 contacts front steering control member 120.

The rider's seat 166 rests on saddle 132. The rider's right foot 168 is positioned on the right pedal 144. The rider's left foot 170 is positioned on the left pedal of the invention 100.

ADDITIONAL FEATURES

In view of the wide variety of embodiments to which the principles of the invention can be applied, it should be apparent that the detailed description of a preferred embodiment is illustrative only and should not be taken as limiting the scope of the invention. For example power could be transmitted to the device using a wide variety of linkages and levers could be used instead of the rotational pedal mechanism illustrated.

Also, the principles of the present invention work equally well whether the vehicle is self-propelled, rider-propelled, gravity propelled, or propelled by other sources, such as wind. Accordingly, the vehicle of the present invention could readily include forms of propulsion, such as a motor, sail or other forms of propulsion without compromising the principles of the present invention.

I claim:

1. A two wheel steering bicycle with independently steerable wheels comprising:
   a top tube member and
   a rear head tube member connected to said top tube member wherein:
     said rear head tube member having a center point;
     said rear head tube member having a longitudinal axis;
   a rear headset member;

a front head tube member connected to said top tube member wherein:
said front head tube member having a center point;
said front head tube member having a longitudinal axis;
a front headset member;
a seat tube member connected to said top tube member;
a rear fork member that extends upward with said fork member steerer column pivotably mounted within said rear head tube member using said rear headset member;
a single rear wheel being rotatably mounted on said rear fork member;
a front fork member that extends upward with said fork member steerer column pivotably mounted within said front head tube member using said front headset member;
a single front wheel being rotatably mounted on said front fork member;
a rear steering handle connected to said rear fork member;
a front steering handle connected to said front fork member;
a saddle connected to said seat tube wherein:
said saddle orients a rider facing parallel to a vertical plane intersecting said center point of said rear head tube member and said center point of said front head tube member;
a pedal mechanism including means of transferring rotational energy from said pedal mechanism to said rear wheel;
said rear fork member being free to move about said rear head tube longitudinal axis independently of movement of said front fork member about said front head tube longitudinal axis;
the angular position of said rear fork member relative to said top tube member about said rear head tube longitudinal axis being controllable by a single rider's hand;
the angular position of said front fork member relative to said top tube member about said front head tube longitudinal axis being controllable by a single rider's hand;
whereby the rider can independently steer the rear and front wheels of this device by using one hand to steer the rear wheel and the other hand to steer the front wheel.

2. The two wheel steering bicycle with independently steerable wheels according to claim 1, wherein said front and rear steering handles position the rider's hands on a plane perpendicular to said vertical plane that intersects said center point of said rear head tube member and said center point of said front head tube member.

3. The two wheel steering bicycle with independently steerable wheels according to claim 2, wherein said pedal mechanism include:
chain and cogs for transferring rotational energy from said pedal mechanism to said rear wheel.

* * * * *